US009118934B2

(12) United States Patent
Breau et al.

(10) Patent No.: US 9,118,934 B2
(45) Date of Patent: Aug. 25, 2015

(54) INTEGRATION OF REMOTE ELECTRONIC DEVICE WITH MEDIA LOCAL AREA NETWORK

(75) Inventors: Jeremy R. Breau, Leawood, KS (US); Jason R. Delker, Olathe, KS (US); Manish Mangal, Overland Park, KS (US); Mathew Oommen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1223 days.

(21) Appl. No.: 12/689,121

(22) Filed: Jan. 18, 2010

(65) Prior Publication Data

US 2011/0179184 A1 Jul. 21, 2011

(51) Int. Cl.
| | |
|---|---|
| G06F 15/16 | (2006.01) |
| H04N 21/2343 | (2011.01) |
| H04L 29/12 | (2006.01) |
| H04L 29/06 | (2006.01) |
| H04N 21/258 | (2011.01) |
| H04N 21/27 | (2011.01) |
| H04N 21/414 | (2011.01) |
| H04N 21/6405 | (2011.01) |
| H04N 21/643 | (2011.01) |
| H04L 12/18 | (2006.01) |
| H04L 12/28 | (2006.01) |
| H04N 21/422 | (2011.01) |
| H04N 21/4223 | (2011.01) |
| H04L 29/08 | (2006.01) |

(52) U.S. Cl.
CPC .......... *H04N 21/2343* (2013.01); *H04L 61/106* (2013.01); *H04L 65/4076* (2013.01); *H04L 65/605* (2013.01); *H04N 21/25808* (2013.01); *H04N 21/27* (2013.01); *H04N 21/41407* (2013.01); *H04N 21/6405* (2013.01); *H04N 21/64322* (2013.01); *H04L 12/1886* (2013.01); *H04L 12/2838* (2013.01); *H04L 67/16* (2013.01); *H04L 2012/2849* (2013.01); *H04N 21/4223* (2013.01); *H04N 21/42203* (2013.01)

(58) Field of Classification Search
CPC ............ H04L 12/1886; H04L 12/2838; H04L 65/605
See application file for complete search history.

(56) References Cited

U.S. PATENT DOCUMENTS

| | | | |
|---|---|---|---|
| 6,701,527 B2 | 3/2004 | Schein et al. | |
| 7,929,538 B2 * | 4/2011 | Gobara et al. | ................ 370/392 |
| 8,254,305 B1 | 8/2012 | Breau et al. | |

(Continued)

OTHER PUBLICATIONS

Breau, Jeremy R., et al., Patent Application entitled "System and Method for Bridging Media Local Area Networks," filed Jan. 18, 2010, U.S. Appl. No. 12/689,081.

(Continued)

*Primary Examiner* — Ranodhi Serrao
*Assistant Examiner* — Thomas Richardson

(57) ABSTRACT

A server is provided. The server comprises a processor, a memory, and an application stored in the memory that, when executed by the processor, receives a progressively uploaded media stream from a remote electronic device. The application also converts the progressively uploaded media stream from a first format to a second format and buffers the converted media stream. The application also transmits the buffered converted media stream to a bridge into a media local area network based on a mapping of the remote electronic device to the media local area network, wherein the mapping is stored in the memory.

20 Claims, 5 Drawing Sheets

(56) References Cited

U.S. PATENT DOCUMENTS

| | | | |
|---|---|---|---|
| 8,358,640 | B1 | 1/2013 | Breau et al. |
| 2001/0033554 | A1* | 10/2001 | Ayyagari et al. ............... 370/328 |
| 2004/0078807 | A1 | 4/2004 | Fries et al. |
| 2004/0117831 | A1 | 6/2004 | Ellis et al. |
| 2005/0058144 | A1* | 3/2005 | Ayyagari et al. ............... 370/401 |
| 2005/0097595 | A1 | 5/2005 | Lipsanen et al. |
| 2006/0095472 | A1* | 5/2006 | Krikorian et al. .......... 707/104.1 |
| 2006/0245403 | A1 | 11/2006 | Kumar |
| 2007/0211734 | A1 | 9/2007 | Yang et al. |
| 2008/0126550 | A1 | 5/2008 | Yasuma |
| 2008/0235358 | A1 | 9/2008 | Moribe et al. |
| 2009/0019485 | A1 | 1/2009 | Ellis et al. |
| 2009/0210908 | A1 | 8/2009 | Sammarco |
| 2009/0249067 | A1 | 10/2009 | Lie et al. |
| 2009/0307307 | A1* | 12/2009 | Igarashi ........................ 709/203 |
| 2010/0080238 | A1* | 4/2010 | Allan et al. .................... 370/401 |
| 2010/0142530 | A1* | 6/2010 | Zha et al. ....................... 370/390 |
| 2010/0162321 | A1 | 6/2010 | Bradley |
| 2010/0211665 | A1 | 8/2010 | Raza et al. |
| 2010/0322213 | A1 | 12/2010 | Liu et al. |
| 2011/0107379 | A1 | 5/2011 | Lajoie et al. |
| 2011/0158610 | A1 | 6/2011 | Paul et al. |
| 2011/0270680 | A1 | 11/2011 | Lim |
| 2011/0317678 | A1* | 12/2011 | Allan et al. .................... 370/338 |
| 2012/0134291 | A1 | 5/2012 | Raleigh |

OTHER PUBLICATIONS

Breau, Jeremy R., et al., Patent Application entitled "Femtocell Bridging in Media Local Area Networks," filed Jun. 1, 2010, U.S. Appl. No. 12/791,859.

"Address Resolution Protocol," Wikipedia, http://en.wikipedia.org/w/index.php?title=Address_Resolution_Protocol&printable=yes, (last visited Aug. 25, 2009).

Bahlmann, Bruce, "DLNA Basics, Bridging Services within a Connected Home," Communications Technology, http://www.cable360.net/print/ct/deployment/techtrends/23787.html, Jun. 1, 2007.

Bahlmann, Bruce, "Digital Living Network Alliance (DLNA) Essentials," Birds-Eye.Net, http://www.birds-eye.net/article_archive/digital_living_network_alliance_dlna_essentials.htm, Apr. 1, 2007.

"Network address translation," Wikipedia, http://en.wikipedia.org/w/index.php?title=Network_address_translation&printable=yes, Aug. 20, 2009.

Notice of Allowance dated Apr. 11, 2011, U.S. Appl. No. 12/689,081, filed Jan. 18, 2012.

Pre-Interview Communication dated Jun. 5, 2012, U.S. Appl. No. 12/791,859, filed Jun. 1, 2010.

Pre-Interview Communication dated Jul. 31, 2012, U.S. Appl. No. 12/698,495, filed Feb. 2, 2010.

Delker, Jason R., et al., Patent Application entitled "Centralized Program Guide," filed Feb. 2, 2010, U.S. Appl. No. 12/698,495.

Notice of Allowance dated Sep. 14, 2012, U.S. Appl. No. 12/791,859, filed Jun. 1, 2010.

Final Office Action dated Jan. 2, 2013, U.S. Appl. No. 12/698,495, filed Feb. 2, 2010.

Advisory Action dated Mar. 11, 2013, U.S. Appl. No. 12/698,495, filed Feb. 2, 2010.

Breau, Jeremy R., et al., Patent Application entitled "Femtocell Bridging in Media Local Area Networks," filed Dec. 11, 2012, U.S. Appl. No. 13/711,544.

Office Action dated Sep. 10, 2014, U.S. Appl. No. 12/698,495, filed Feb. 2, 2010.

Pre-Interview Communication dated Feb. 5, 2015, U.S. Appl. No. 13/711,544, filed Dec. 11, 2012.

Notice of Allowance dated Apr. 29, 2015, U.S. Appl. No. 13/711,544, filed Dec. 11, 2012.

\* cited by examiner

FIG. 4
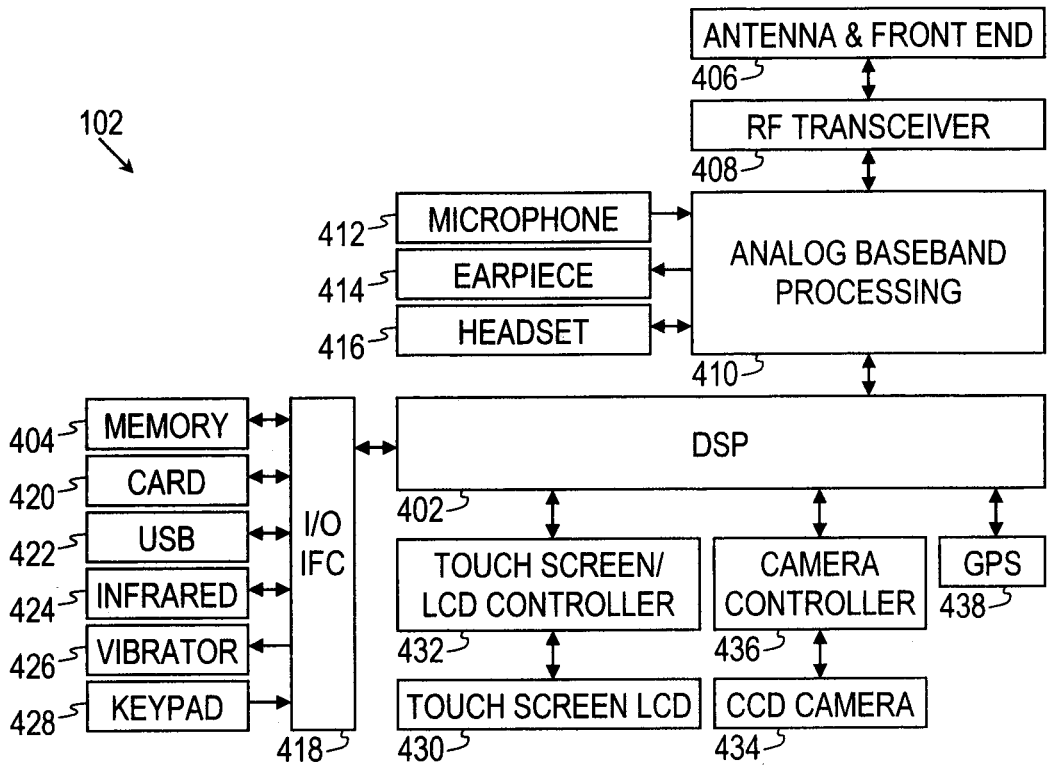
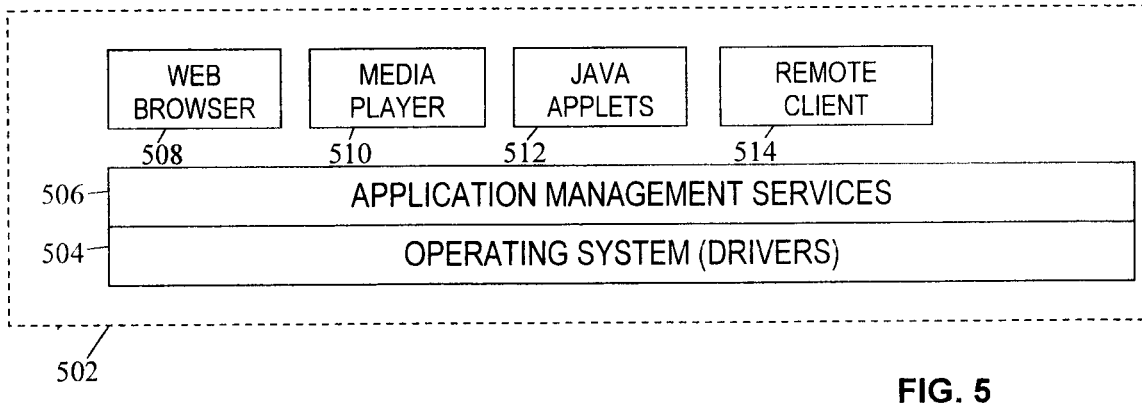
FIG. 5

INTEGRATION OF REMOTE ELECTRONIC DEVICE WITH MEDIA LOCAL AREA NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices may use the simple service discovery protocol (SSDP) to announce their presence and exchange messages with other devices on a media local area network (LAN). The simple service discovery protocol is a multicast protocol and may be used by consumer devices operating under universal plug and play (UPnP) conventions. Mobile and stationary consumer devices may be used in home networks. For example, a computer storing media may send photographs to a picture frame device for display. Devices may use the simple service discovery protocol to multicast their identity, their device type, their functionality, and their availability. Devices may multicast video files, audio files, and digital picture files for sharing with other devices in the media local area network. Devices may also use the simple service discovery protocol to discover and communicate with supporting peripheral devices on their own networks such as printers and storage devices. The simple service discovery protocol also promotes interoperability and content sharing between devices in a home network. The simple service discovery protocol may extend the communications capabilities of the television and other traditionally passive consumer home devices to interoperate with computers and other media sharing devices.

SUMMARY

In an embodiment a server is provided. The server comprises a processor, a memory, and an application stored in the memory that, when executed by the processor, receives a progressively uploaded media stream from a remote electronic device. The application also converts the progressively uploaded media stream from a first format to a second format and buffers the converted media stream. The application also transmits the buffered converted media stream to a bridge into a media local area network based on a mapping of the remote electronic device to the media local area network, wherein the mapping is stored in the memory.

In an embodiment, a processor-implemented method of linking an external electronic device with a media local area network is provided. The method comprises a management server defining a first mapping from a first electronic device to a second electronic device, wherein the first electronic device is internal to the media local area network and the second electronic device is external to the media local area network, wherein the mapping is stored in a memory of the management server, and wherein the first electronic device communicates with other electronic devices comprising the media local area network using the simple service discovery protocol (SSDP). The method also comprises the first electronic device multicasting a first media content on the media local area network and a bridging device internal to the media local area network sending the first media content to the management server. The method also comprises the management server sending the first media content to the second electronic device based on the first mapping. The method also comprises defining a second mapping from the second electronic device to the media local area network, wherein the second mapping is stored in the memory of the management server. The method also comprises the second electronic device sending a second media content to the management server and the management server sending the second media content to the bridging device based on the second mapping. The method also comprises the bridging device multicasting the second media content to the media local area network.

In an embodiment, a server is provided. The server comprises a processor, a memory, and an application stored in the memory that, when executed by the processor, receives a media stream from a remote electronic device. The server also transcodes the media stream and attenuates a jitter of the media stream by buffering the transcoded media stream. The server also transmits the buffered transcoded media stream to a bridge into a media local area network based on a mapping of the remote electronic device to the media local area network, wherein the mapping is stored in the memory.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a block diagram of a mobile device according to an embodiment of the disclosure.

FIG. 5 is a block diagram of a software architecture for a mobile device according to an embodiment of the disclosure.

DETAILED DESCRIPTION

Figure 1:
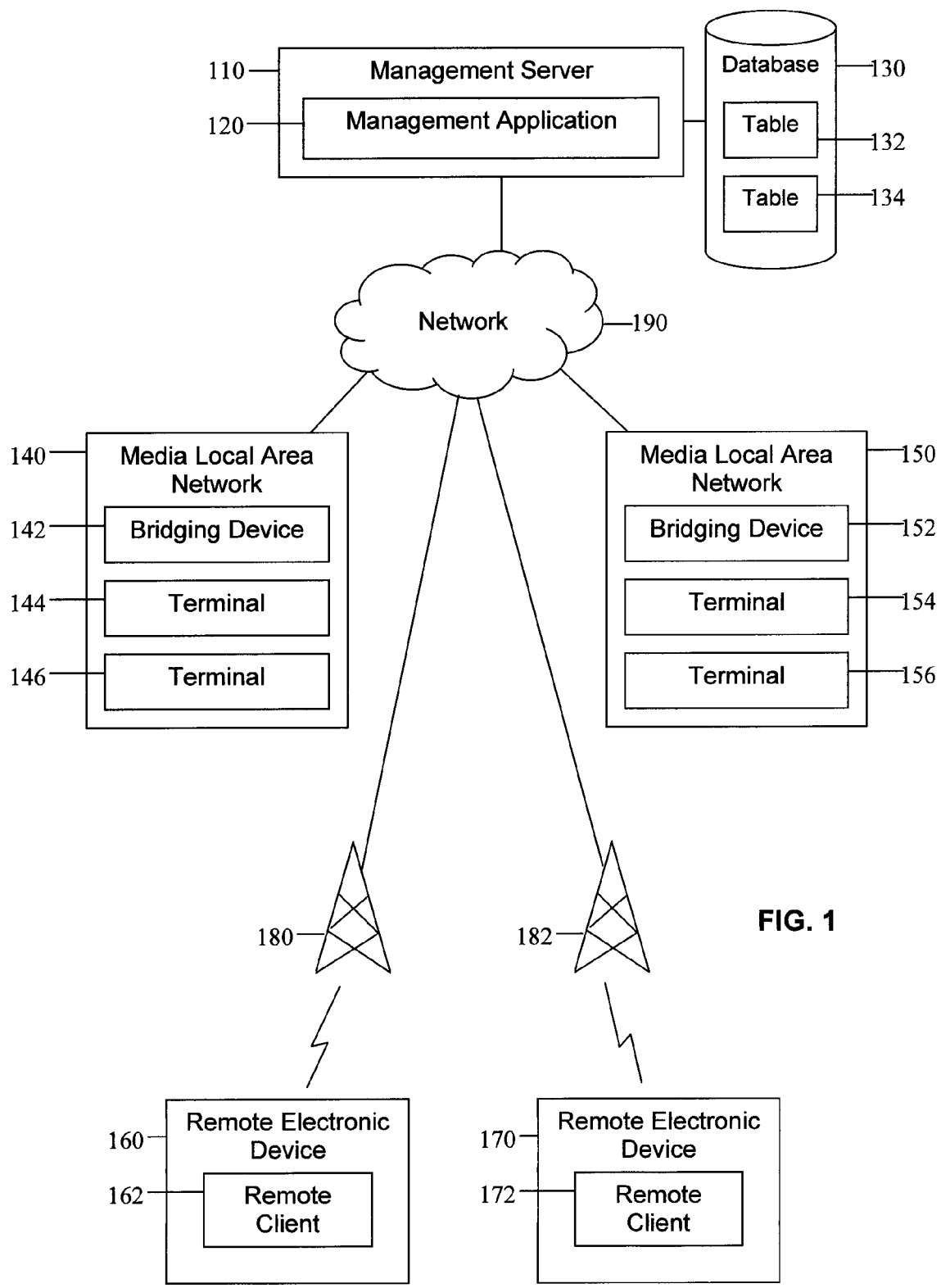
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and method of integrating a remote electronic device with a media local area network (LAN). A remote electronic device as described herein is not physically present at the media local area network. The remote electronic device, for example a mobile telephone, may record and transmit electronic content for processing and forwarding to one or a plurality of devices on a home and/or other small network. The remote electronic device may record the content in one format and progressively upload the content to a management server where the content is buffered and may be transcoded to a second format. The management server may determine from a database table entry that the content may be forwarded to the media local area network. The management server sends the content to a bridging device that may be a computer associated with the media local area network. The bridging device multicasts messages containing the received content on the media local area network. A device on the media local area network may take possession of the content in the multicasted messages and may begin playing the received content. The media local area network and its devices may observe the digital living network alliance (DLNA) standard that may be used by manufacturers of electronic devices to allow entertainment and other devices within the home network or small office network to share their content with each other.

A mobile telephone with video recording capability may make video recordings and transmit the video content to the management server that may, after locating a database table entry, forward the content to the bridging device of the media local area network. The mobile telephone may not address the video content to any final destination device and may rely on the management server to handle forwarding of content. The mobile telephone may record the video in one format and a device that later plays the video may use a different format. The mobile telephone and its transmission links may have technical limitations preventing the device from sending the video content in a continuous stream. The mobile telephone may instead progressively upload the video content to the management server in blocks or chunks that may be of different sizes. The management server buffers the chunks of video content to attenuate jitter in the progressively uploaded media content. The management server may transcode the video content from the format in which the content was received from the mobile telephone to the format displayable by the destination device.

Devices within a media local area network, for example televisions, picture frame devices, media players, and common appliances, may communicate with each other via multicast messages using the simple service discovery protocol (SSDP). When such devices communicate with other devices outside their media local area network, their communications may be encapsulated in internet protocol packets because the simple service discovery protocol is a multicast protocol and its packets may not be forwarded by devices outside of the media local area network without encapsulation. When the management server forwards media content generated by the remote electronic device to a device in a media local area network that uses the simple service discovery protocol, the management server may send the media content in internet protocol packets to a bridging device on the media local area network. The management server examines database tables for entries that map the remote electronic device to the bridging device. The database tables contain a plurality of entries describing authorized combinations of sending devices and media local area networks represented by bridging devices. The encapsulation by the management server of content originated in one of a plurality of software presentation formats into internet protocol packets permits externally generated content to be delivered to devices on media local area networks using only the simple service discovery protocol.

When media is ready for transmission by the management server, the present disclosure additionally teaches an embodiment incorporating the sending of notifications to recipient devices on media local area networks. A plurality of recipient devices may be grouped into a profile. The remote electronic device, when sending progressive uploads of media content to the management server, may specify a profile instead of having to name specific media local area networks as destinations. Using profiles to designate a grouping of recipient devices instead of individually listing recipient devices or their associated bridging devices in a table containing mappings may improve speed of content delivery and more efficiently use management server processing and memory capacity.

Turning now to FIG. 1, a system 100 for integrating a remote electronic device with a media local area network is described. The system 100 comprises a management server 110, a management application 120, media local area networks 140, 150, bridging devices 142, 152, terminals 144, 146, 154, 156, remote electronic devices 160, 170, base transceiver stations 180, 182, and a network 190.

The management server 110 may be a computer system. Computer systems are discussed in greater detail hereinafter. The management server 110 may comprise one computer or a plurality of computers, for example, a server farm wherein many server computers cooperate to share a processing load. The management server 110 may comprise a plurality of computers that are located at different places, for example, to provide geographical diversity and increased service reliability. The functionality of the management server 110 could be provided as a cloud computing infrastructure. The management server 110 executes one or more applications including the management application 120.

The management server 110 receives progressive uploads of media content from a remote electronic device 160, stores, and may transcode the content, and sends the content to a media local area network 140. The media content is then multicasted within the media local area network 140 and a terminal 144 therein may take possession of the media content. The media content may be video and/or audio content that is recorded by the remote electronic device 160, for example a mobile telephone with video recording functionality. The remote electronic device 160 records and may progressively upload the media content to the management server 110 in blocks or chunks of electronic content. The management application 120 executing on the management server 110 may cache the blocks of received content as they are received and assemble them in the proper order. The present disclosure teaches a plurality of remote electronic devices 160, 170 progressively uploading content to the management server 110 via base transceiver stations 180, 182, and the forwarding of the content by the management server 110 to media local area networks 140, 150 and their bridging devices 142, 152 for multicast distribution to terminals 144, 146, 154, 156. Multiple such associations between remote electronic devices 160, 170 and media local area networks 140, 150 may be concurrently supported by the management server 110. The remote electronic device 160 may wirelessly transmit blocks of content to the management server 110 via the base transceiver stations 180, 182 using the Code Division Multiple Access (CDMA), Global System for Mobile Communications (GSM), Universal Mobile Communications System (UMTS), and/or Long-term Evolution (LTE), Worldwide Interoperable Microwave Access (WiMAX), and WiFi communications technologies.

Bridging devices 142, 152 are associated with media local area networks 140, 150, respectively, and forward messages multicasted by the terminals 144, 146, 154, 156 on their respective media local area networks 140, 150. The bridging devices 142, 152 may forward all packets received in internal multicasts to the management server 110 regardless of whether the packets are intended for local terminals 144, 146 or are intended for other media local area networks 140, 150. Bridging devices 142, 152 may be computer systems with processor, memory, radio transceiver circuitry, and installed network adapter cards or embedded network adapter circuitry that may perform a plurality of functions in addition to forwarding packets to the management server 110. Bridging devices 142, 152 may be network devices, such as routers or switches. In an embodiment, bridging devices 142, 152 may only perform the tasks of receiving multicast packets, encapsulating the packets into internet protocol packets with the internet protocol address of the management server 110, and forwarding the packets to the management server 110. Bridging devices 142, 152 are configured with internet protocol addresses that are visible to stations outside of the respective media local area networks 140, 150 of the bridging devices 142, 152. Bridging devices 142, 152 may communicate with the management server 110 using wired links. Bridging devices 142, 152 may communicate wirelessly with the terminals 144, 146, 154, 156 in their respective media local area networks 140, 150.

The transmissions from the remote electronic device 160 containing content may also include at least one address or other identification of a destination media local area network 140. The management application 120 may consult a table 132 in an associated database 130 to verify that the remote electronic device 160 is authorized to send the content to the destination media local area network 140. The management application 120 may send a notification for delivery to the terminal 144 when the received content is ready for distribution. The management application 120 then sends the content to the bridging device 142 on the media local area network 140 wherein the terminal 144 resides. The bridging device 142 then multicasts the content in at least one message within the media local area network 140 whereupon the terminal 144 takes possession of the messages and may begin playing the content.

The remote electronic device 160 may be a mobile telephone or other portable electronic device that may record content and wirelessly transmit the content to a base transceiver station and on to the management server 110. The remote electronic device 160 may be used in conjunction with another proximate device, for example a video camera that records video and transmits the video to the mobile phone whereupon the mobile phone forwards the content to the management server 110. In an example, the user of the remote electronic device 160 may be a man attending his son's soccer game. The man may use the video recording functionality resident on his mobile telephone to record portions of the game for transmission to his son's grandparents at home in a distant city. The grandparents may view the video or still images captured from the video on a television, computer, or picture frame device in their home. These devices may be on a media local area network 140 wherein the devices, or terminals 144, 146, communicate with each other via multicast messaging using the simple service discover protocol (SSDP).

The remote electronic device 160 may record video, audio, and/or other content and sends the content to the management server 110. Because of wireless bandwidth limitations, the remote electronic device 160 may not send the recorded content in a live, streamed manner to the management server 110. The remote electronic device 160 may also not send the entire video record of the soccer game in a single transmission. The remote electronic device 160 may rather record, cache, and transmit the content to the management server 110 in a progressive or segmented fashion. The content may be transmitted in chunks or blocks of equal or unequal sizes that the management server 110 may store in buffer files and assemble into a single continuous file once the content is fully received. As the remote electronic device 160 progressively transmits media content to the management server 110, the remote electronic device 160 also identifies the destinations to which the media content is to be sent. The man in the example using the remote electronic device 160 may designate the destination as one of at least one terminal 144, a profile associated with the grandparents associated with the terminal 144, or the media local area network 140. The man may also request the management server 110 to send notifications to the terminal 144 or other device to alert the grandparents when the video is available for their viewing and enjoyment.

The management server 110 receives the progressive uploads of content from the remote electronic device 160, caches the progressive uploads in buffer files, and assembles the content into one or more final content files when the full content is received. The progressive uploads may be received, cached, and assembled in various file formats, for example in the motion picture experts group, version 4 (MPEG-4) format for some video and audio content and the motion picture experts group-1 audio layer 3 (MP3) for some audio content. The present disclosure teaches the inclusion and application of codec functionality that may convert audio analog signals to digital content and computer digital sound back to audio when appropriate. The codec functionality may encode a data stream or signal for transmission, storage or encryption, or may decode it for playback or editing. In addition to applying codec functionality, buffering, and assembling the received content into files, the management server 110 also deals with jitter and latency issues associated with the audio, video, or other content received from the remote electronic device 160. Jitter and latency may be caused by network congestion, timing drift, route changes, queuing, contention, and serialization effects on the path from the remote electronic device 160 to the management server 110. The management application 120 in its buffering of the progressive uploads and assembly of the uploaded content into playable content may apply procedures to correct jitter, latency, and other problems with the received content.

The remote electronic device 160 may be a mobile phone, video camera or audio recorder, or other handheld or mobile device operated by a user that may be a consumer or other non-professional user of such devices. For this reason as well as technical or environmental reasons such as lighting, background noise, or interference from other proximate unrelated devices, the condition of the content received by the management server 110 may require treatment to correct these problems as well as the aforementioned jitter and latency problems before the content can be processed for transmission to the terminal 144. If the remote electronic device 160 is in motion while recording and transmitting content, for example in an automobile, the signal sent by the remote electronic device 160 may shift from the base transceiver station 180 to another base transceiver station 182. If the remote electronic device 160 is receiving and relaying content from another device, for example a video camera, there may be additional jitter, latency, attenuation, or other disruptions or degradations of signal quality. The management application 120 may correct for these losses, declines, or delays in signaling during buffering and content assembly before the content may be ready for further processing and transmission to the terminal 144.

The management server 110 may not wait until it has received and buffered all of the progressive uploads of content from the remote electronic device 160 before it applies procedures to correct problems with jitter, latency, and signal quality. Because the content as generated by the remote electronic device 160 may be contained in numbered frames or in another ordered manner that may be sequenced upon receipt, the management server 110 during receipt and buffering of the content may begin assembling and testing the content and applying the correction procedures before all progressive uploads are received. This may permit the management server 110 to process the content and have it ready for transmission to the terminal 144 earlier than if it waited until the entire progression of media uploads from the remote electronic device 160 had been received.

When the management server 110 first begins receiving progressive uploads of content from the remote electronic device 160, it may seek to determine that the remote electronic device 160 is authorized to submit the content for forwarding to the media local area network 140. In the example provided above, the man using his mobile phone with video capability records his son playing soccer and initiates transmission of the content to the boy's grandparents for viewing on a device in their home. The management server 110 may consult a table 132 in the database 130 that associates the remote electronic device 160 with the terminal 144 and notes that exchanges between the two devices are authorized. The table 132 may more likely associate the remote electronic device 160 with the media local area network 140 that may contain electronic devices in the grandparents' home.

Devices, or terminals 144, 146, within the media local area network 140 may initiate communications with each other via multicast using the simple service discovery protocol. Terminals 144, 146 may be unable to communicate with devices outside of their media local area network 140 without their multicast simple service discovery protocol packets being encapsulated into internet protocol (IP) packets and addressed to specific internet protocol addresses. The bridging device 142 on the media local area network 140 may receive simple service discovery protocol multicast transmissions within the media local area network 140 and by default forward the packets to the management server 110 for its examination and forwarding on to terminals 154, 156 on another media local area network 150 or elsewhere. Messages from devices outside the media local area network 140 intended for terminals 144, 146 inside the media local area network 140 may be transmitted using the internet protocol and initially received by the bridging device 142. The bridging device 142 may remove the internet protocol packet information and multicast the message within the media local area network 140 using the simple service discovery protocol whereupon the terminal 144 may recognize and take possession of the message. Transmissions between terminals 144, 154 on different media local area networks 140, 150 as well as transmissions between external devices such as the remote electronic devices 160, 170 and the terminals 144, 154 may be encapsulated in internet protocol packets. This application includes subject matter related to U.S. patent application Ser. No. 12/689,081, filed Jan. 18 2010, entitled "System and Method for Bridging Media Local Area Networks," by Jeremy R. Breau, et al., now U.S. Pat. No. 8,254,305B1 issued on Aug. 28, 2012, which is herein incorporated by reference.

The tables 132, 134 that contain authorized combinations of senders and recipients of media content may list bridging devices 142, 152 as senders and/or as recipients of messages instead of terminals 144, 146, 154, 156. The bridging devices 142, 152 may have externally facing internet protocol addresses and may receive messages intended for all devices within their respective media local area networks 140, 150. An external message intended for a terminal 144 on the media local area network 140 may be addressed to the internet protocol address of the bridging device 142. When the remote electronic device 160 indicates that it wishes media content to be sent to the media local area network 140, its instruction may be interpreted by the management server 110 as sending the media content to the internet protocol address of the bridging device 142. The management server 110 may not formally "know" about terminals 144, 146, 154, 156 because the management server 110 may only deal with devices, stations, and other entities that communicate using the internet protocol and the terminals 144, 146, 154, 156 may use only the simple service discovery protocol. The bridging devices 142, 152 in effect represent the terminals 144, 146, 154, 156, respectively, outside of their media local area networks 140, 150. The tables 132, 134 may describe remote electronic devices 160, 170 that are permitted to send media content to bridging devices 142, 152.

Terminals 144, 146, 154, 156 that are recipients of messages sent by remote electronic devices 160, 170 may also be grouped in profiles so that the users of the remote electronic devices 160, 170 do not need to remember individual names of recipients, the terminals 144, 146, 154, 156 that the recipients use, or their respective media local area networks 140, 150. The management server 110 may contain mappings of individual recipients or groups of recipients to profiles and may map the profiles to the bridging devices 142, 152 associated with the media local area networks 140, 150 with which the recipients are associated. The user of the remote electronic device 160 may enter into his mobile telephone a recipient profile of "grandparents" and the management server 110 may consult a file that maps this profile to the internet protocol addresses of the bridging device 142 for the soccer playing boy's maternal grandparents and the address of the bridging device 152 for the boy's paternal grandparents. Profiles may provide convenience to parties generating and sending content as well as to recipients of content.

At about the same time or shortly after the management server 110 is receiving and buffering content, accessing codec functionality, applying other procedures to correct jitter and other content condition problems, and checking tables 132, 134 to determine authorization for delivery of content, the management server 110 may also perform transcoding of the received content. The remote electronic device 160 recording and sending content and the terminals 144, 146, 154, 156 that receive and play content may not use the same file and presentation formats. For example, the man using his mobile phone to record his son's athletic event may record the action using the motion picture experts group (MPEG) format. The boy's grandparents may view the received content on a terminal 144, for example a television, computer, or other electronic device that displays the content using a different format, for example, the windows media center video format. The present disclosure teaches the management server 110 having transcoding functionality to receive content in a plurality of recording formats, decode the content, and encode the content into a plurality of different playing formats.

Transcoding and application of codec functionality may take place concurrently or as a collection of integrated processes. In addition to transforming the software code of the media content, these format-conversion actions may additionally comprise video de-interlacing, audio resampling, frame rate conversion, smoothing, and other procedures that may be known to those skilled in the art. Transcoding may involve decoding the received content to an intermediate format in a way that still contains the content of the original, and then encoding the resulting file into the target format. Transcoding may also involve the process of directly changing assembled software code to work on different platforms or operating systems. Because of the diversity of remote electronic devices 160, 170 that may be originating content and the diversity of recipient terminals 144, 146, transcoding may require intermediate states of content adaptation to make certain the source content will adequately play on the target recipient terminals 144, 146.

In the example described herein, the grandparents that are recipients of the video content portraying their grandson's soccer game may have in their home a picture frame device that displays video and audio content. The picture frame device may be connected by a cable to a personal computer executing an operating system and application software that are specialized for presenting video, audio, and other media to consumer and home users. For example, the computer may execute Microsoft Windows Media Center software that may play media content using a Windows media video format, another proprietary format, or a non-proprietary format. Each of these formats used to display the content may differ from the format that the boy's father may use when recording the soccer game. Assuming the management server 110 embarks on its tasks of receiving and buffering the progressive uploads of content from the father's remote electronic device 160 and determining from tables 132, 134 that the remote electronic device 160 is authorized to send content to the media local area network 140, the management server 110 also transcodes the content that may involve the described processes and otherwise prepares the content for transmission. The management server 110 may determine from examining information about the profile associated with the recipients, the recipients' media local area network 140, and/or the associated bridging device 142 that the received and buffered content should be converted to a particular format. The profile for these particular recipients may explicitly state that media received from a specific remote electronic device 160 is to be converted to a specific display format. The progressive uploads from the remote electronic device 160 may contain instructions regarding the presentation format to which the content should be transcoded.

The management server 110 associates the profile or otherwise identified recipients with the bridging device 142 associated with the media local area network 140 within which the recipient terminal 144 resides. In the example, the media local area network 140 of the recipient grandparents may include the picture frame device that may play video content, the personal computer serving media files, and a variety of other electronic devices including the bridging device 142. The devices on the media local area network 140 communicate with each other by multicast using the simple service discovery protocol. The bridging device 142 may be the sole device on the media local area network 140 that is visible to devices outside the media local area network 140 and is visible to those external devices via its internet protocol address. When the management server 110 has transcoded the content and prepares to begin forwarding the content as directed in the instructions from the remote electronic device 160, the profiles, and the tables 132, 134, the management server 110 looks specifically for the internet protocol address of the bridging device 142. As noted, the management server 110 may not be specifically aware of the existence of terminals 144, 146, 154, 156 and their use of the simple service discovery protocol. The management server 110 may deal with internet protocol addressing for specific source and destination stations and is likely unaware of picture frame devices and other consumer devices on media local area networks 140, 150.

As the management server 110 begins sending the transcoded content, it encapsulates the content into internet protocol packets addressed to the bridging device 142. Similar to the manner in which the management server 110 buffered the content upon receipt from the remote electronic device 160 before transcoding, the management server 110 may, after transcoding, buffer the outgoing content. Because of processing and transmission speeds of the management server 110, network connections between the management server 110 and the bridging device 142, and processing and throughput speeds of the bridging device 142, the management server 110 may buffer the outgoing content in a variety of manners. Buffering of the outgoing content by the management server 110 may permit the bridging device 142 to receive and multicast the transcoded content within the media local area network 140 in a manner wherein the content may be captured and played by the media-serving computer and attached picture frame device as a continuous media presentation without interruption. The management server 110 may use a plurality of buffering and content transmission methods to deliver the content to the bridging device 142 in a manner that the content may appear to be received in a stream by the grandparents using the terminal 144 on their media local area network 140.

The present disclosure also teaches the sending of notifications to terminals 144, 146, 154, 156 regarding the availability of the content. In the example, the exact time that the father of the soccer-playing boy may begin transmitting the content may not be known and the father may not wish the boy's grandparents to have to wait unnecessarily by their picture frame device for the beginning of their receipt of the content. The management server 110 may send notifications to the terminal 144, in this example the picture frame device, or may send notifications to other devices, for example the grandparents' mobile telephones, pagers, or electronic mailboxes providing information regarding the start time of the playing of the media content. The capability of the management server 110 to use profiles in determining destinations for content may be useful in sending notifications about the imminent availability of content. Because a profile may include a plurality of terminals 144, 146, 154, 156 associated with a plurality of media local area networks 140, 150, the management server may send notifications to terminals 144, 146, 154, 156 named in a profile advising of the time that a live or nearly live feed of media content may begin. In an embodiment, a terminal 144 that receives a notification that media content will begin playing at a certain time may have the option to multicast a simple service discovery protocol message for receipt by the bridging device 142 and passage to the management server 110 requesting that the playing of the media content be delayed for a certain time period or indefinitely.

While an extended family generating content on a mobile phone and viewing it on a media local area network 140 has been a continuing example described herein, the present disclosure is suitable for use in other applications. A small business or professional practice may use a plurality of electronic devices in a media local area network 140 and may wish to receive content from an external device. A small business, for example a real estate agency or an architect's office, may wish to receive live or nearly live transmission of an event of interest filmed by an employee or other person and transmitted to the office. A medical or legal practice may wish to view a transmission of an ongoing medical or legal procedure. If the exact start times of these events is not known, notifications could be sent when the events are about to begin. The management server 110 may be operated on a commercial basis by a provider of wireless or other communication services. Users of remote electronic devices 160, 170 and terminals 144, 146, 154, 156 may arrange with an operator of the management server 110 to provide the services described herein to receive, buffer, transcode, and forward media content of many kinds.

The present disclosure has described various embodiments involving a remote electronic device 160 located outside of a media local area network 140 generating or relaying media content to a management server 110 where the content is buffered, optionally transcoded, and transmitted to a bridging device 142 for distribution to a terminal 144. The present disclosure also teaches transmissions in the opposite direction wherein a terminal 144 or first electronic device internal to a media local area network 140 may originate messaging or other electronic content and multicast the message inside the media local area network 140 using the simple service discovery protocol. The bridging device 142 forwards the message in an internet protocol packet to the management server 110 for its processing and forwarding to remote electronic device 160 or second electronic device that is external to the media local area network 140. Mappings between source and destination entities may be located in tables 132, 134 stored in the database a similar manner as previously described.

The tables 132, 134 may contain mappings between addresses of a plurality of types. When a terminal 144 in a media local area network 140 generates a transmission intended for a terminal 154 in a different media local area network 150, the table 132 may search for a mapping of the terminal 144 and/or its associated bridging device 142 to the bridging device 152. Such a table entry may comprise the internet protocol address of the bridging device 142 mapped to the internet protocol address of the bridging device 152. The present disclosure teaches mappings between a broader variety of address types, for example, a mapping of an internet protocol address to a telephone number of a mobile device or to an electronic serial number (ESN) of a mobile device. The present disclosure also teaches the use of profiles or groupings of recipient terminals 144, 146, 154, 156 that may reside on different media local area networks 140, 150. Profiles may be regarded as aliases that point to files containing the internet protocol addresses of the bridging devices 142, 152 that may be the entry points to media local area networks 140, 150 wherein destination terminals 144, 146, 154, 156 may reside. Mappings in tables 132, 134 may therefore include profiles. A valid entry located in the table 132 may map the remote electronic device 160 to a profile called "grandparents." This profile may be an alias pointing to the bridging devices 142, 152 associated with the terminals 144, 154, respectively, that are picture frame devices used by the maternal and paternal grandparents, respectively, of the boy playing soccer. The use of profiles containing pointers to what may be large groups of addresses may allow faster searching of the tables 132, 134 in the database 130 and faster overall performance of the system 100.

The creation of mappings in the tables 132, 134 may be done by an authorized person at a remote computer (not shown). In the example used herein, the gentleman filming his son's soccer game and transmitting the content to the boy's grandparents may use a web browser interface to access the management server 110 to request to send the content to the grandparents. The grandparents at a different remote computer may receive a message and reply that the man is authorized to send the content. For the grandparents, providing such authorization may be a simple matter of clicking on an Internet link provided in an electronic mail message automatically generated by the management server 110.

If the management server 110 is operated on a commercial basis by a wireless communication service provider, the man using the remote electronic device 160 and the grandparents receiving the content from the man may receive the services described herein under a subscription agreement with the provider. The services may be part of a general subscription agreement the man and/or the grandparents have with the wireless provider for wireless voice and data services.

The remote electronic devices 160, 170 may be one of a mobile telephone, a personal digital assistant (PDA), a media player, a video camera, a laptop computer, a notebook computer, and a tablet computer. The remote electronic devices 160, 170 include remote clients 162, 172 that are software components enabling the users of the remote electronic devices 160, 170 to provide instructions to the management server 110 regarding content transmissions, for example, instructions about the terminals 144, 146, 154, 156 that are to receive electronic content, notifications to be sent, and the presentation format into which the progressively uploaded should be transcoded.

Figure 2:
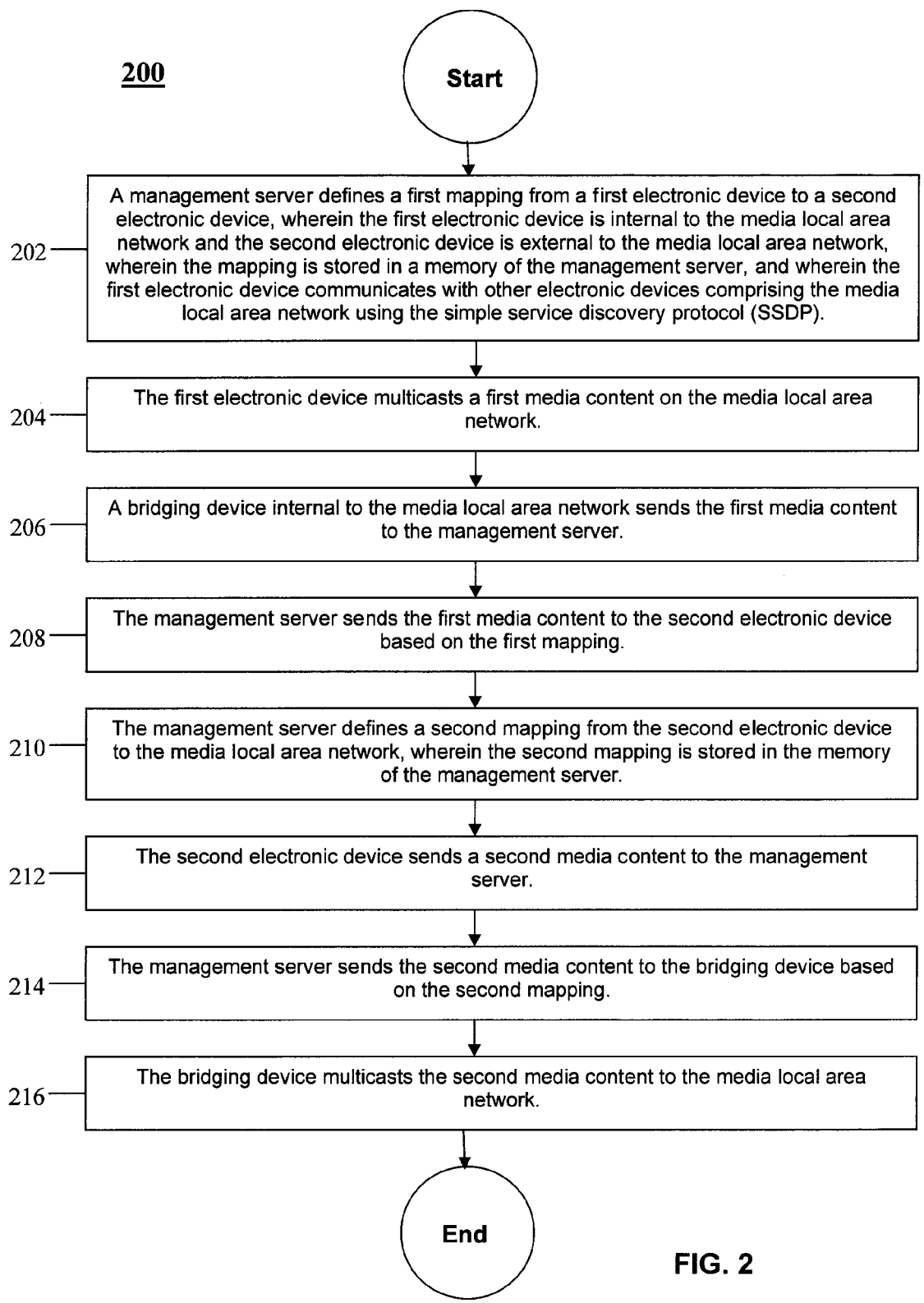
FIG. 2 is a flow chart illustrating a method according to an embodiment of the disclosure.

Turning now to FIG. 2, a processor-implemented method 200 of integrating a remote electronic device with a media local area network 140 is provided. Beginning at block 202, a first mapping of a first electronic device to a second electronic device is defined. The first electronic device is internal to the media local area network 140 and the second electronic device is external to the media local area network 140. The first electronic device may be the bridging device 142 and the second electronic device may be the remote electronic device 160. The first mapping is stored in a memory of the management server 110, as described previously in at least one table 132, 134 in the database 130 associated with the management server 110. The bridging device 142 may forward multicast transmissions generated by the terminal 144 that may only communicate with other electronic devices on the media local area network 140, for example the terminal 146, using the simple service discovery protocol (SSDP). Transmissions multicasted by the terminal 144 with a final intended destination outside of the media local area network 140 may be received and forwarded by the bridging device 142.

At block 204, the first electronic device multicasts a first media content on the media local area network 140 and at block 206, the bridging device 142 internal to the media local area network 140 sends the first media content to the management server 110. The bridging device 142 may receive all simple service discovery protocol messages multicasted by the first electronic device and may by default encapsulate every received message into an internet protocol packet with the internet protocol address of the management server 110 and transmit the packet.

At block 208, the management server 110 sends the first media content to the second electronic device based on the first mapping. The first mapping may be in the table 132 and may map the internet protocol address of the bridging device 142 to the internet protocol address of the second electronic device.

At block 210, a second mapping from the second electronic device to the media local area network 140 is defined, wherein the second mapping is stored in the memory of the management server 110. At block 212, the second electronic device sends a second media content to the management server 110.

At block 214, the management server 110 sends the second media content to the bridging device 142 based on the second mapping. At block 216, the bridging device 142 multicasts the second media content to the media local area network 140. The various terminals 144, 146 resident in the media local area network 140 receive the multicast transmissions of the second media content from the bridging device 142 whereupon the terminal 144 may recognize that it is the intended recipient of the second media content and takes possession of the content.

The method 200 may further comprise negotiating a selection of a first codec between the second electronic device and the management server 110 and the second electronic device encoding the second media content based on the first codec. The method 200 may further comprise negotiating a selection of a second codec between the second electronic device and the management server 110. The method 200 may further comprise the management server 110 transcoding the first media content based on the second codec, wherein the management server 110 sends the transcoded first media content to the second electronic device.

Figure 3:
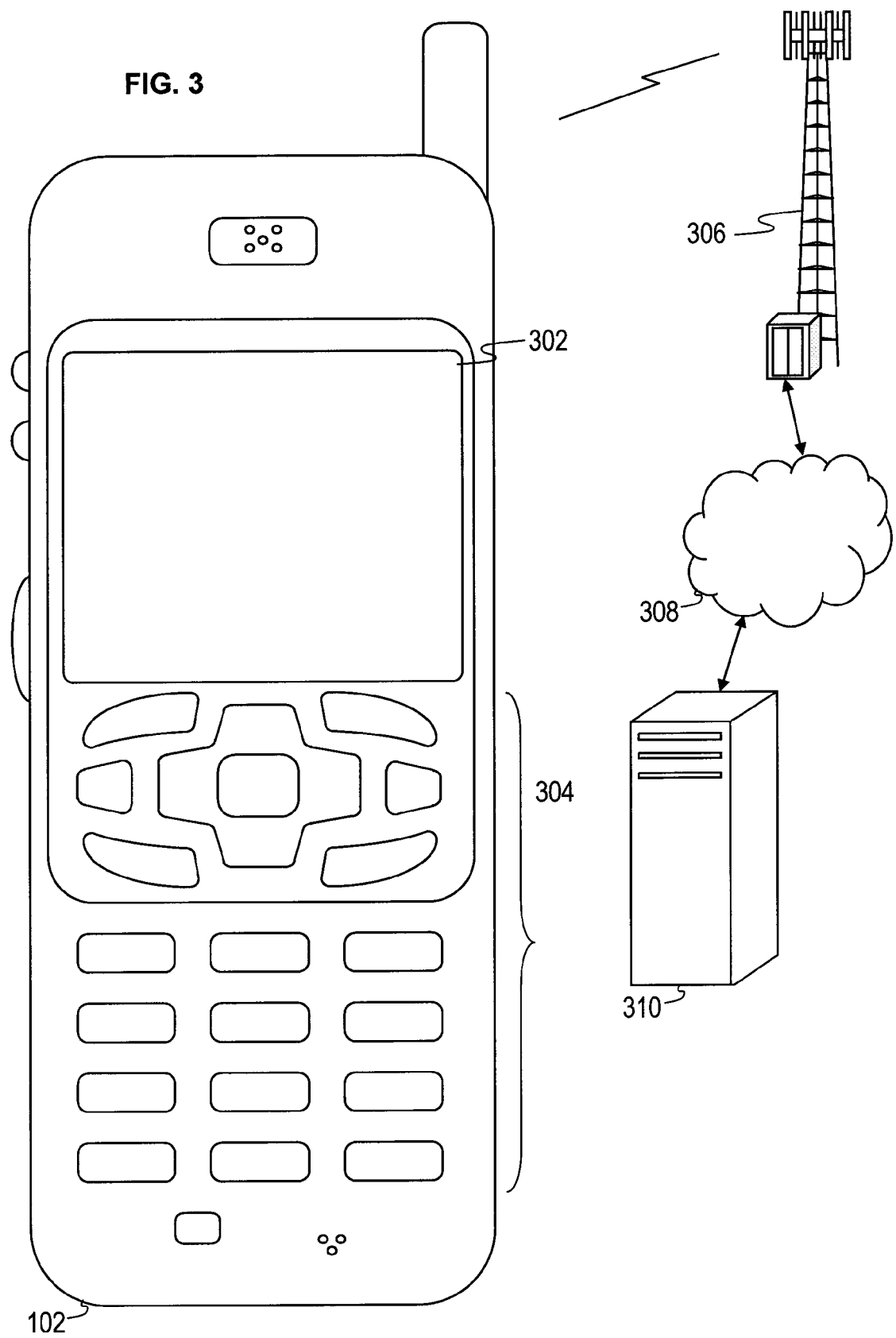
FIG. 3 is an illustration of a mobile device according to an embodiment of the disclosure.

FIG. 3 shows a wireless communications system including a mobile device 102. FIG. 3 depicts the mobile device 102, which is operable for implementing aspects of the present disclosure, but the present disclosure should not be limited to these implementations. The mobile device 102 may in some embodiments exemplify the remote electronic device 160, 170 described in the system 100. Though illustrated as a mobile phone, the mobile device 102 may take various forms including a personal computer, a mobile computer, a portable computer, a tablet computer, a laptop computer, and a desktop computer. The mobile device 102 may take various forms with a screen size reduced to a maximum of 4 inches by 6 inches, including a mobile telecommunications device, a mobile handset, a personal digital assistant (PDA), a handheld gaming device, a handheld wireless mobile device, a pager, a digital camera, a digital music player, a digital calculator, and other portable electronic devices. The operator of the portable electronic device may select content formats based on the reduced screen size. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 302 and a touch-sensitive surface and/or keys 304 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 302 to show a web page. The web page may be obtained via wireless communications with a base transceiver station (BTS) 306, a wireless network access node, a peer mobile device 102 or any other wireless communication network or system. While a single base transceiver station 306 is illustrated, it is understood that the wireless communication system may comprise additional base transceiver stations. In some instances, the mobile device 102 may be in communication with multiple base transceiver stations 306 at the same time. The base transceiver station 306 (or wireless network access node) is coupled to a wired network 308, such as the Internet. Via the wireless link and the wired network, the mobile device 102 has access to information on various servers, such as a server 310. The server 310 may provide content that may be shown on the display 302. Alternately, the mobile device 102 may access the base transceiver station 306 through a peer mobile device 102 acting as an intermediary, in a relay type or hop type of connection.

FIG. 4 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a radio access network (RAN) or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby handsets and/or wireless base stations.

The input/output interface 418 may further connect the DSP 402 to the vibrator 426 that, when triggered, causes the mobile device 102 to vibrate. The vibrator 526 may serve as a mechanism for silently alerting the user to any of various events such as an incoming call, a new text message, and an appointment reminder.

The keypad 428 couples to the DSP 402 via the input/output interface 418 to provide one mechanism for the user to make selections, enter information, and otherwise provide input to the mobile device 102. Another input mechanism may be the touch screen LCD 430, which may also display text and/or graphics to the user. The touch screen LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the mobile device 102. Also shown in FIG. 5 are a web browser application 508, a media player application 510, and JAVA applets 512. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality. The remote client 514 may in some embodiments exemplify the remote client 162, 172 described in the system 100.

Figure 6:
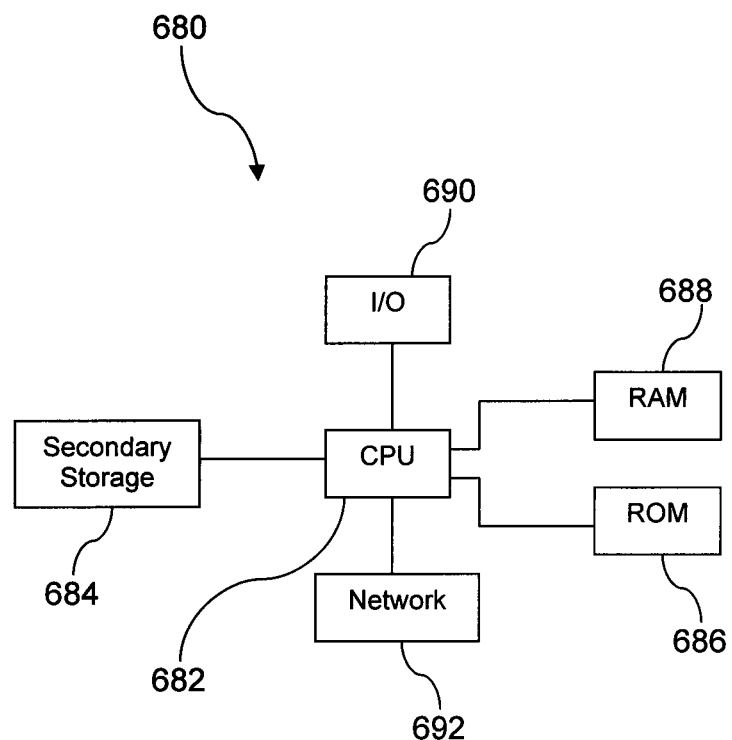
FIG. 6 illustrates an exemplary computer system suitable for implementing some aspects of the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A management server, comprising:
   at least one processor;
   a non-transitory memory; and
   an application stored in the non-transitory memory of the management server that, when executed by the at least one processor of the management server,
      receives a progressively uploaded media stream from a remote mobile electronic device via a radio access network, wherein the remote mobile electronic device is not connected to, and is outside of, a media local area network that includes a plurality of terminals,
      determines that the management server is allowed to forward the progressively uploaded media stream to a bridge associated with the media local area network based on consulting a table in the memory that maps the remote mobile electronic device to the bridge associated with the media local area network,
      converts the progressively uploaded media stream from a first format to a second format,
      buffers the converted media stream prior to forwarding the converted media stream to the bridge for multicasting to at least one of the plurality of terminals within the media local area network, and
      forwards, via encapsulated packets, the buffered converted media stream to the bridge associated with the media local area network based on consulting the table in order for the at least one of the plurality of terminals to present the buffered converted media stream, wherein any media content that is sent by any of the plurality of terminals via the bridge and intended for the media local area network or the remote mobile electronic device and any media content that is sent by the remote mobile electronic device and intended for any of the plurality of terminals is received and forwarded by the management server.

2. The management server of claim 1, wherein the remote mobile electronic device is any of a mobile phone, a personal digital assistant (PDA), a video camera, and a media player.

3. The management server of claim 1, wherein the first format is a moving picture experts group revision 4 (MPEG4) format.

4. The management server of claim 1, wherein the second format is a windows media video format.

5. The management server of claim 1, wherein the application attenuates a jitter of the progressively uploaded media stream by buffering the converted media stream.

6. The management server of claim 1, wherein the application reduces a latency of the progressively uploaded media stream by buffering the converted media stream.

7. The management server of claim 1, wherein the application further transmits a notification for delivery to the at least one of a plurality of terminals within the media local area network when the buffered converted media stream is ready for distribution.

8. A method of transmitting media between an external mobile electronic device and a media local area network, comprising:
   multicasting, by an internal electronic device of a plurality of internal electronic devices, a first media content on the media local area network comprising the plurality of internal electronic devices and a bridging device;
   sending, by the bridging device that is internal to the media local area network, the first media content to a management server via encapsulated packets;
   determining, by the management server, that the management server is allowed to forward the first media content to the external mobile electronic device based on consulting a first table stored in a memory of the management server;
   sending, by the management server, the first media content to the external mobile electronic device based on consulting the first table, wherein the external mobile electronic device is not connected to, and is outside of, the media local area network that includes the plurality of internal electronic devices;
   sending, by the external mobile electronic device via wireless communication, a progressively uploaded second media content to the management server;
   determining, by the management server, that the management server is allowed to forward the progressively uploaded second media content to the bridging device associated with the media local area network based on consulting a second table stored in the memory of the management server that maps the external mobile electronic device to the bridging device associated with the media local area network;
   buffering, by the management server, the progressively uploaded second media content before sending the progressively uploaded second media content to the bridging device for multicasting to at least one of the plurality of internal electronic devices;
   sending, by the management server via encapsulated packets, the progressively uploaded second media content to the bridging device based on consulting the second table; and
   multicasting, by the bridging device, the progressively uploaded second media content to the at least one of the plurality of internal electronic devices within the media local area network, wherein any media content that is sent by any of the plurality of internal electronic devices via the bridging device and intended for the media local area network or the external mobile electronic device and any media content that is sent by the external mobile electronic device and intended for any of the plurality of internal electronic devices is received and forwarded by the management server.

9. The method of claim 8, further comprising:
negotiating a selection of a first codec between the external mobile electronic device and the management server; and
encoding, by the external mobile electronic device, the progressively uploaded second media content based on the first codec.

10. The method of claim 8, further comprising:
negotiating a selection of a second codec between the external mobile electronic device and the management server; and
transcoding, by the management server, the first media content based on the second codec, wherein the management server sends the transcoded first media content to the external mobile electronic device.

11. The method of claim 8, wherein the external mobile electronic device is any of a mobile phone, a personal digital assistant (PDA), and a media player.

12. The method of claim 8, wherein the external mobile electronic device is any of a laptop computer, a notebook computer, and a tablet computer.

13. The method of claim 8, wherein the buffering comprises attenuating a jitter of the progressively uploaded second media content sent by the external mobile electronic device.

14. The method of claim 8, wherein sending, by the external mobile electronic device, the progressively uploaded second media content to the management server comprises progressively uploading, by the external mobile electronic device, the second media content to the management server.

15. A management server, comprising:
at least one processor;
a non-transitory memory; and
an application stored in the non-transitory memory of the management server that, when executed by the at least one processor of the management server,
receives a media stream from a remote mobile electronic device via a radio access network, wherein the remote mobile electronic device is not connected to, and is outside of, a media local area network that includes a plurality of terminals,
determines that the management server forward the media stream to a bridge associated with the media local area network based on consulting a table in the memory that maps the remote mobile electronic device to the bridge associated with the media local area network,
transcodes the media stream,
attenuates a jitter of the media stream by buffering the transcoded media stream prior to forwarding the transcoded media stream to the bridge for multicasting to at least one of the plurality of terminals within the media local area network, and
forwards, via encapsulated packets, the buffered transcoded media stream to the bridge associated with the media local area network based on consulting the table in order for the at least one of the plurality of terminals within the medial local area network to present the buffered transcoded media stream, wherein any media content that is sent by any of the plurality of terminals via the bridge and intended for the media local area network or the remote mobile electronic device and any media content that is sent by the remote mobile electronic device and intended for any of the plurality of terminals is received and forwarded by the management server.

16. The management server of claim 15, wherein the mapping is defined via an application programming interface (API) of the application receiving inputs from a remote computer.

17. The management server of claim 15, wherein the media stream is formatted in moving picture experts group 4 (MPEG4) format before it is transcoded.

18. The management server of claim 15, wherein the remote mobile electronic device is any of a mobile phone, a personal digital assistant (PDA), and a video camera.

19. The management server of claim 15, wherein the remote mobile electronic device is any of a laptop computer, a notebook computer, and a tablet computer.

20. The management server of claim 15, wherein the application further transmits a notification for delivery to the at least one of the plurality of terminals within the media local area network responsive to the buffered transcoded media stream being ready for distribution.

* * * * *